US007950748B2

(12) United States Patent
Coutermarsh et al.

(10) Patent No.: US 7,950,748 B2
(45) Date of Patent: May 31, 2011

(54) INTERNAL HYDRAULIC LOCKING APPARATUS AND METHODS FOR MAKING AND USING SAME

(75) Inventors: Richard Alfred Coutermarsh, Kingwood, TX (US); John Reid Eastman, Kingwood, TX (US); Mark Miller, Allen, TX (US)

(73) Assignee: InnerLoc, Inc, Houston, TX (US)

( * ) Notice: Subject to any disclaimer, the term of this patent is extended or adjusted under 35 U.S.C. 154(b) by 678 days.

(21) Appl. No.: 11/352,921

(22) Filed: Feb. 13, 2006

(65) Prior Publication Data

US 2006/0186730 A1 Aug. 24, 2006

Related U.S. Application Data

(60) Provisional application No. 60/652,441, filed on Feb. 11, 2005.

(51) Int. Cl.
*B60R 25/08* (2006.01)

(52) U.S. Cl. ................ 303/89; 188/353; 70/63; 70/256; 70/277

(58) Field of Classification Search .................... 303/89; 292/144, DIG. 32; 188/265, 353; 70/275–277, 70/256, 257, 263, 264, 278.1, 280, 57.1, 70/58, 63, 91
See application file for complete search history.

(56) References Cited

U.S. PATENT DOCUMENTS

| | | | | |
|---|---|---|---|---|
| 2,709,610 | A * | 5/1955 | Chandler | 292/1 |
| 4,866,963 | A * | 9/1989 | Leininger et al. | 70/278.2 |
| 5,055,658 | A | 10/1991 | Cockburn | |
| 5,154,493 | A * | 10/1992 | Futrell et al. | 303/89 |
| 5,431,487 | A * | 7/1995 | Poricelli | 303/89 |
| 5,603,536 | A * | 2/1997 | Bauer et al. | 292/144 |
| 5,685,578 | A * | 11/1997 | Schneider | 292/144 |
| 5,704,008 | A | 12/1997 | Duvall, Jr. | |
| 5,755,126 | A | 5/1998 | Lanigan et al. | |
| 5,781,399 | A | 7/1998 | Lanigan et al. | |
| 5,791,702 | A | 8/1998 | Liroff | |
| 5,806,355 | A | 9/1998 | Lanigan et al. | |
| 5,857,721 | A | 1/1999 | Liroff | |
| 5,917,423 | A | 6/1999 | Duvall | |
| 5,931,033 | A | 8/1999 | Lanigan et al. | |
| 6,047,576 | A | 4/2000 | Lanigan et al. | |
| 6,049,448 | A | 4/2000 | Lanigan et al. | |
| 6,050,116 | A * | 4/2000 | Cole | 70/256 |
| 6,113,163 | A | 9/2000 | Liroff | |
| 6,229,988 | B1 | 5/2001 | Stapefeld et al. | |
| 6,331,022 | B1 | 12/2001 | Liroff | |
| 6,536,815 | B1 | 3/2003 | Liroff | |
| 6,550,829 | B1 | 4/2003 | Dobson | |
| 6,634,721 | B2 | 10/2003 | Holt | |

(Continued)

OTHER PUBLICATIONS

Pages from www.mjst.com/Security_Solutions.htm (pages attached).

(Continued)

*Primary Examiner* — Pam Rodriguez
(74) *Attorney, Agent, or Firm* — Robert W Strozier

(57) ABSTRACT

An hydraulically activated internal locking apparatus is disclosed including an hydraulic fluid reservoir, an hydraulically activated locking system and a electronic control system, where the electronic control system is in electrical communication with the locking system and the reservoir is in fluid communication with the locking system so that the locking system can be transitioned from a locked state to an unlocked state when the electronic control system receives a unlock or lock code or instruction.

13 Claims, 7 Drawing Sheets

U.S. PATENT DOCUMENTS

| | | | |
|---|---|---|---|
| 6,665,613 | B2 | 12/2003 | Duvall |
| 6,725,158 | B1 | 4/2004 | Sullivan et al. |
| 6,737,962 | B2 | 5/2004 | Mayor |
| 6,844,829 | B2 | 1/2005 | Mayor |
| 6,845,641 | B2 * | 1/2005 | Hsieh .............................. 70/257 |
| 6,847,825 | B1 | 1/2005 | Duvall et al. |
| 6,870,476 | B2 | 3/2005 | Cockburn et al. |
| 6,876,858 | B1 | 4/2005 | Duvall et al. |
| 6,982,643 | B2 | 1/2006 | Garfinkle |
| 7,010,066 | B2 | 3/2006 | Sullivan et al. |
| 7,020,190 | B2 | 3/2006 | Sullivan |
| 7,027,486 | B2 | 4/2006 | Sullivan |
| 7,038,066 | B2 | 5/2006 | Hall et al. |
| 7,053,823 | B2 | 5/2006 | Cervinka et al. |
| 7,059,159 | B2 | 6/2006 | Lanigan et al. |
| 7,063,362 | B1 | 6/2006 | Liroff |
| 7,091,857 | B2 | 8/2006 | Lanigan et al. |
| 7,106,211 | B2 | 9/2006 | Duvall |
| 7,484,391 | B1 * | 2/2009 | Moore ............................ 70/257 |
| 2001/0050509 | A1 | 12/2001 | Holt |
| 2004/0143392 | A1 | 7/2004 | Kilfeather et al. |
| 2004/0155477 | A1 | 8/2004 | Lanigan et al. |
| 2004/0204969 | A1 | 10/2004 | Wu |
| 2005/0062344 | A1 | 3/2005 | Holt et al. |
| 2005/0171695 | A1 | 8/2005 | Sullivan et al. |
| 2005/0179546 | A1 | 8/2005 | Lanigan et al. |
| 2005/0219037 | A1 | 10/2005 | Huang |
| 2005/0231365 | A1 | 10/2005 | Tester et al. |
| 2006/0033616 | A1 | 2/2006 | Silva et al. |
| 2006/0071786 | A1 | 4/2006 | Fano |
| 2006/0117820 | A1 | 6/2006 | Lanigan et al. |
| 2006/0162435 | A1 | 7/2006 | Watanabe |
| 2006/0198427 | A1 | 9/2006 | Sullivan |
| 2006/0220847 | A1 | 10/2006 | Lanigan et al. |
| 2006/0290147 | A1 | 12/2006 | Liroff |
| 2007/0080802 | A1 | 4/2007 | Cockburn et al. |

OTHER PUBLICATIONS

Pages from www.hoc-loc.com (attached).
"Warning Says Violent Cargo Theft on Rise for U.S.: Worldwide cargo theft estimated to be worth $50B a year, and increasing risks of violent thefts," NewsEdge Corporation, Oct. 10, 2006.
Scott Greiper and Mark Sauter, "Beyond Aviation: The Emerging Ground Transportation Security Market," Sep. 2006, Legend Merchant Group.
Sean Kilcarr, "Cargo theft a growing threat," Drivers, Oct. 10, 2002.
Alex Ortolani and Robert Block, "Hong Kong port project hardens container security," The Wall Street Journal, Jul. 29, 2005.
http://findarticles.com/p/articles/mi_m0EIN/is_2004_Sept_13/ai_n6190149.
GE references: four attached pdfs from their website re CommerceGuard and VeriWise products.
Safefrieght webpages.
SC Integrity.
Sealock.
SkyBitz, Inc.
TransCore.
Transport Security's ENFORCER GPS system.
Wireless Matrix.
Lawrence_Livermore_2005_conference_abstract_316488, Feb. 15, 2005.
NSSN_search_result.
Cargo_Theft_Prevention_A_Handbook_for_Logistics_Security.
Tapa_FSR_and_TSR_Downloads.

* cited by examiner

INTERNAL HYDRAULIC LOCKING APPARATUS AND METHODS FOR MAKING AND USING SAME

RELATED APPLICATIONS

This application claims provisional priority to U.S. Provisional Patent Application Ser. No. 60/652,441, filed 11 Feb. 2005.

BACKGROUND OF THE INVENTION

1. Field of the Invention

The present invention relates to an apparatus for locking containers from the inside and to methods for making and using same.

More particularly, the present invention relates to an apparatus for locking containers from the inside, where the apparatus includes a source of hydraulic fluid, a hydraulically operated locking assembly, and a remotely accessible control assembly and to methods for making and using same.

2. Description of the Related Art

Although most doors are locked on the outside using a variety of locking mechanisms, such outside locking devices are prone to unwanted and/or unlawfully enter either by tampering with the locking mechanism or destroying the locking mechanism.

In recent years, several devices have been developed to lock containers from the inside, where the locking mechanism is activated from the outside by a tough pad or some type of remote activation device. The two systems currently known in the art are a pneumatic device and an electrical device. The pneumatic device is described in PCT published patent application WO2004033322. The electrical device is described at the web site:

Even though a recent trend toward internal locking mechanisms is making in roads into the industrial industries, there is still a need in the art for internal locking mechanisms that are simple to operate, are compact and are reliable.

SUMMARY OF THE INVENTION

The present invention provides an internal locking apparatus including a source of hydraulic fluid, a hydraulically activated locking system and an electronic control system, where the locking system is designed to be mounted inside a container and to be transitioned between a locked position and an unlocked position, which locks or unlocks an opening to the container. The electronic control system is designed to provide power to the locking system to change its state from the locked position to the unlocked position or vis-a-versa.

The present invention also provides an apparatus including a source of hydraulic fluid, a plurality of hydraulically activated locking systems and an electronic control system, where the locking systems are designed to be transitioned between a locked position and an unlocked position, which locks or unlocks an opening to the container. The electronic control system is designed to provide power to the locking systems to change their state from the locked position to the unlocked position or vis-a-versa.

The apparatus can also include a plurality of locking systems. In the case of apparatuses that include multiple locking systems, each locking system can have its own electronic system and its own hydraulic reservoir or the locking systems can share a common hydraulic reservoir and a common electronic system. When the locking systems are independently controlled, then security is higher, but manual locking and/or unlocking are more time consuming. Of course, if the locking systems are controlled via telemetry (Rf, sonic, microwave, radar, etc.), then each locking system can be on a separate frequency, have a separate code or a combination, thereof to further increase security, yet not slow down locking and unlocking operations.

The present invention provides a method for locking a door or an opening to a container including the step of mounting a hydraulically activated locking system on an inner surface of a door or opening or an inner surface of a wall adjacent the door or opening. Once the hydraulically activated locking system is mounted, a hydraulic fluid reservoir is mounted on the inner surface of the door and/or in an interior of the container, room, cavity, compartment, or a similar enclosure and a hydraulic conduit connecting the reservoir to the hydraulic locking system is installed. Once the system and the source are mounted and installed, an electronic control system is installed within the interior and connected to the locking system. The electronic control system includes a component for causing the locking system to transition from an unlocked position to a locked position or vis-a-versa. The component can include a receiver unit capable of receiving an activation signal causing the locking system to transition between the locked position and the unlocked position or vis-a-versa. The component can also include a transmitter unit, where the transmitter unit is capable of transmitting a verification signal designed to verify the authenticity of the activation signal and is capable of transmitting a completion signal and where the receiver unit is also capable of receiving an authentication signal. The component can also include an external entry unit such as a keypad, touch pad or another encoded unit such as a finger print pad, a palm print pad, a rental scanner, or other similar encoded unit, where the external unit is designed to generate a signal to transition the locking system between its locked and unlocked positions or vis-a-versa.

The method can also include the step of installing multiple locking systems and a single reservoir and a single electronic control system or each locking system can have its own reservoir and electronic control system. The method can also include sending and receiving signals from the single electronic control system or the individual electronic systems that cause the locking system to transition between their locked and unlocked positions or vis-a-versa.

BRIEF DESCRIPTION OF THE DRAWINGS

The invention can be better understood with reference to the following detailed description together with the appended illustrative drawings in which like elements are numbered the same.

DEFINITIONS USED IN THE INVENTION

Figure 1A:
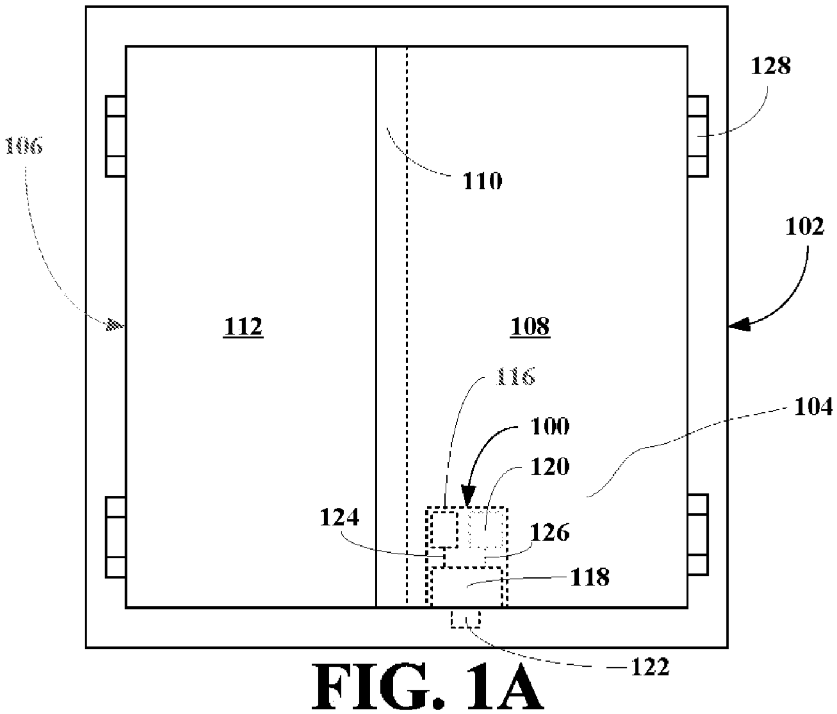
FIGS. 1A&B depict a preferred embodiment of a container internal locking system of this invention.
Figure 1B:
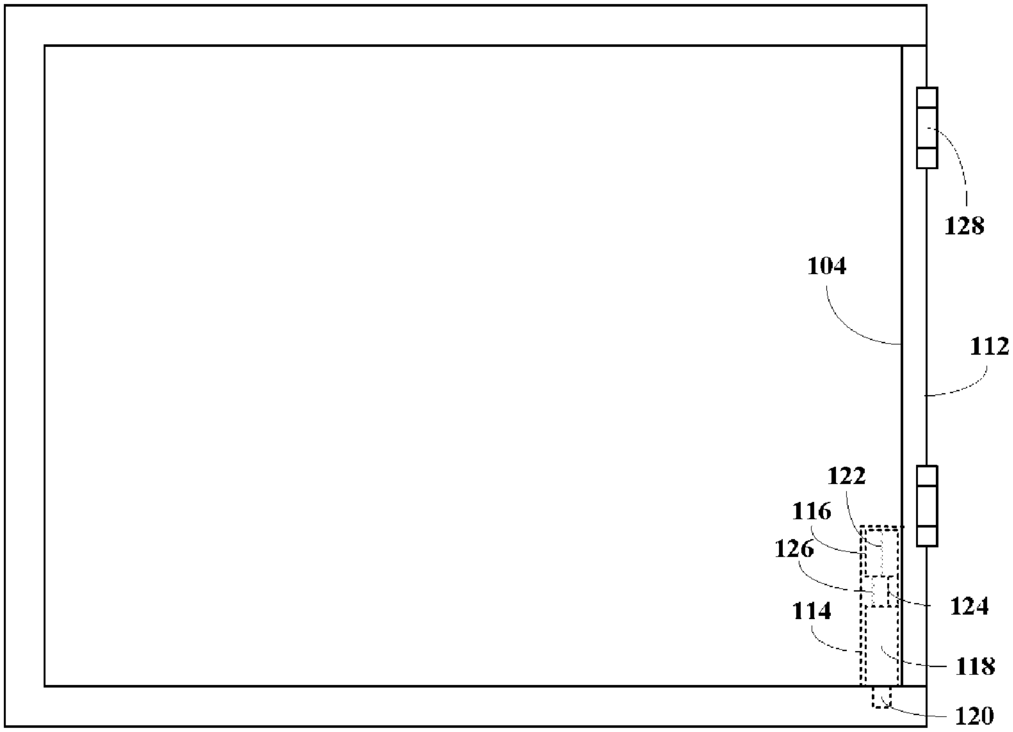
FIGS. 1C&D depict another preferred embodiment of a container internal locking system of this invention.
FIGS. 1E&F depict another preferred embodiment of a container internal locking system of this invention.

The term “fluid communication” means that one or more components of the internal locking systems of this invention are connected to each other by one or more conduits or tubing that support the flow of hydraulic fluid between the components.

The term “electrical communication” means that one or more components of the internal locking systems of this invention are connected by wires or other electrical conducting conduits that support the flow of electricity between the components.

The term “electronic communication” means that one or more components of the internal locking systems of this invention are in wired or wireless communication so that electronic signals and information can be exchanged between the components. For example, if the electronic control system of the internal locking systems of this invention includes a remote control unit communicates instructions to the electronic control system via any wireless communication protocol, the electronic control system is capable of receiving and acting on the instructions such as unlock the locking unit of the system.

DETAILED DESCRIPTION OF THE INVENTION

The inventors have found that a locking apparatus for any container accessible by a door or an opening can be installed within an interior of the container, where the locking apparatus permits the door or opening to be locked from the inside so as to increase container security. The inventors have found that a hydraulic system provides superior performance, superior reliability, is compact and easily serviced.

The present invention broadly relates to an internal locking apparatus including a hydraulically activated locking system, a hydraulic fluid reservoir and an electronic control system. The hydraulic fluid reservoir is connected to the locking system via a hydraulic conduit, while the electronic control system is connected to the locking system via an electrical conduit. The hydraulic locking system includes a locking member that moves between a retracted position (an unlocked position) and an extended position (a locked position). The hydraulic locking system further includes a pump and a solenoid valve, where the valve is connected to the pump via hydraulic lines and the pump is connected to the hydraulic conduit. The electronic control system includes a receiver and optionally a transmitter. The pump and the valve are electrically connected to the electronic control system so that when a state transition signal is received by the electronic control system via its receiver, a signal is sent to the pump and valve to either extend or retract the locking member depending on its present state. Thus, if the locking member is extended, then the signal will cause the member to be retracted and vis-a-versa. The electronic control system can also include a transmitter which can be used to monitor the state of the lock, to verify the authentication of a receive transition signal or to signal a successful change in state. The apparatus can also include an external unit in electrical communication with the electronic control system and is adapted to allow a person to enter a code directing the locking system to transition between from its locked state to its unlocked state or from its unlocked state to its locked state. The electronic control systems can be constructed to be in wireless communication with a remote unit or a central control unit so that the apparatus can be transitioned remotely between its locked and unlocked state or can be queried as to its state or send information update information periodically on the state of the lock.

The present invention broadly relates to a method for locking a container having an openable opening including the step of installing within the container an internal locking apparatus of this invention. The method also includes the step of issuing a signal to the electronic control system to transition the locking system from its unlocked to its locked position when the opening is in its closed state. The method also includes the step of issuing a second signal to the electronic control system to transition the locking system from its locked position to its unlocked position. The method can also include the steps of loading and unloading contents out of or into the containers interior once the opening is opened. The method can also include the step of monitoring the state of the locking system remotely during transportation. The method can also include the step of transmitting the transition signals from a remote location via a transmitter such as a satellite or cell phone tower. The method can also include the step of entering a code on an external unit. The external unit then issues an instruction to the electronic control system to transition the locking system form one state to another state.

The locking systems of this invention can be based on a solenoid valve configured in two different ways. One preferred valve is a two way, two port, two position 12V DC solenoid valve, which fails in its locked position. The two way, two port, two position 12V DC solenoid valve is designed to act with a single acting cylinder. The pump supplies hydraulic fluid to the cylinder which retracts or extends the locking member depending on the position of the internal spring. The internal spring generally has an about 7 psi spring force and piston can either be moved by the spring or moved by the cylinder.

Another preferred valve is a double acting cylinder, five port, four way, three position 12 V DC solenoid valve. The valve can optionally include an internal spring, which act as a back up. The valve fails in its closed position if hydraulic pressure leaks. The valve opens by putting fluid pressure on one end of the valve. The valve is normally in its closed (all ports blocked) and unlike the two way valve, the force to move the locking member is not the spring force, but is the compressibility of the hydraulic fluid—an incompressible fluid—a much more difficult force to overcome.

Suitable Materials

The hydraulic fluids for use in this invention include, without limitation, any incompressible fluid or mixtures or combinations thereof. Depending on the application, the fluid may be a low temperature tolerant fluid such as antifreeze or for high temperature fluid such as a silicon fluid. For most applications, the preferred fluid is antifreeze such as a glycol. Exemplary examples of suitable glycols are ethylene glycol, propylene glycol, polyethylene glycol, or the like, with ethylene glycol being preferred. Of course, if the fluid is not required for low temperature application, water can be used. Also for low temperature applications an aqueous antifreeze solution can be used as well.

Suitable solenoid valves for use in this invention include, without limitation, two way valves available from Peter Paul, Inc. and three way valves available from Kip, Inc.

Suitable pumps for use in this invention include, without limitation, 12 V DC pumps available from Sur-Flo, Inc.

Suitable electronic control systems for use in this invention include, without limitation, electronic control systems from HYVAIR, Inc. which are keyless activated with remote units and operate at 300 MHz and have secure activation codes.

Suitable external control units for use in this invention include, without limitation, keypads, touch pads, voice-activated device or any other electronic device that can receive a code, verify the code, generate an action signal and transmit the action signal. The electronic devices can also include a retinal scanner, a finger print scanner, a palm print scanner or other identification device.

Suitable receivers for use in this invention include, without limitation, Rf receivers, ultrasound receivers, microwave receivers, IR receivers, near IR receivers, radar receivers, laser receivers, or the like or mixtures or combinations thereof.

Suitable transmitters for use in this invention include, without limitation, Rf transmitters, ultrasound transmitters, microwave transmitters, IR transmitters, near IR transmitters, radar transmitters, lasers, any other wireless communications devices or mixtures or combinations thereof.

DETAILED DESCRIPTION OF DRAWINGS

Referring now to FIGS. 1A&B, a preferred embodiment of an internal locking apparatus, generally 100, is shown. The apparatus 100 is mounted within a container 102 on an inner surface 104 of a double door 106, where one door 108 has a lip 110 that does not allow the other door 112 to be opened until and unless the first door 108 is opened first. The apparatus 100 includes a housing 114. Within the housing 114, the apparatus 100 includes a hydraulic reservoir 116, a hydraulic locking system 118 and an electronic control system 120. The hydraulic locking system 118 includes a retractable locking member 122. The hydraulic reservoir 116 is connected to the hydraulically activated locking system 118 via a hydraulic conduit 124. The locking system 118 is connected to the electronic system 120 via an electrical conduit 126. The doors 108 and 112 are mounted on the container 102 via hinges 128. The container 102 can be a truck trailer, a ship cargo container, or the like.

Figure 1C:
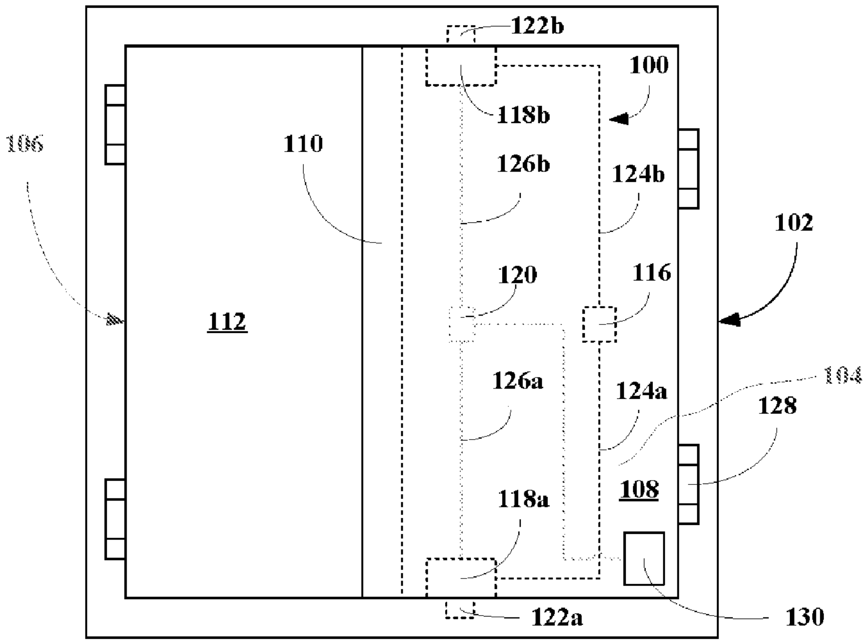
Figure 1D:
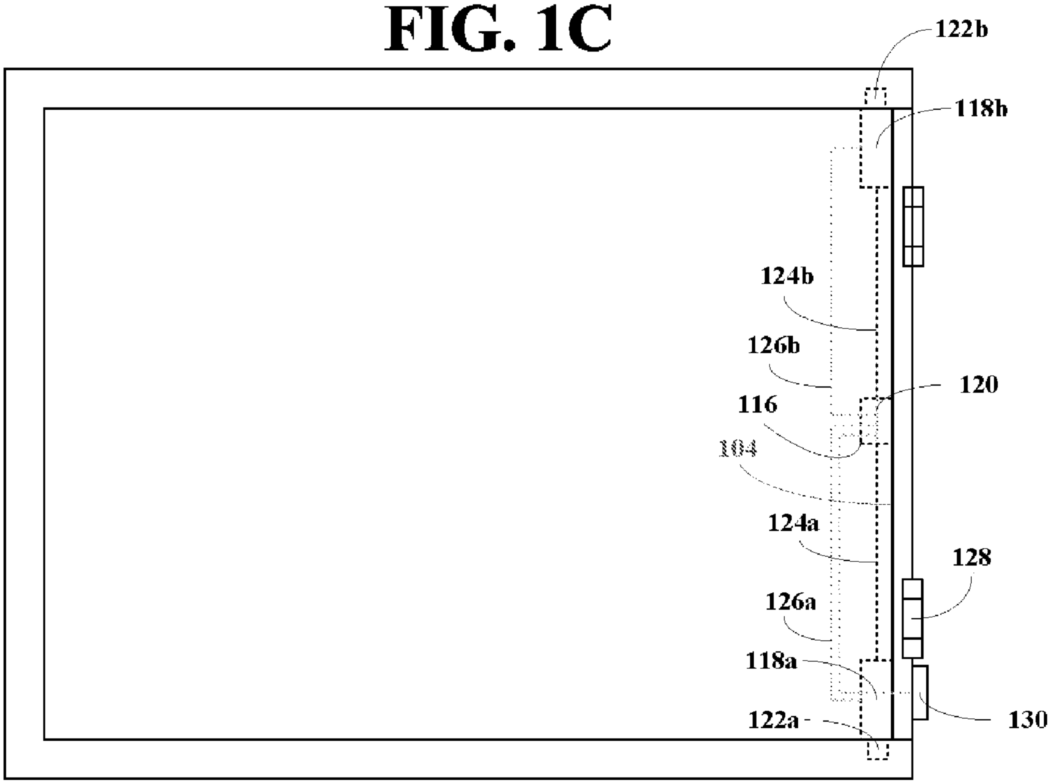

Referring now to FIGS. 1C&D, another preferred embodiment of an internal locking apparatus, generally 100, is shown. The apparatus 100 is mounted within a container 102 on an inner surface 104 of a double door 106, where one door 108 has a lip 110 that does not allow the other door 112 to be opened until and unless the first door 108 is opened first. The apparatus 100 includes a hydraulic reservoir 116, two hydraulic locking systems 118*a&b*, and an electronic control system 120. Each hydraulic locking system 118*a* or *b* includes a retractable locking member 122*a&b*. The hydraulic reservoir 116 is connected to the hydraulically activated locking systems 118*a&b* via hydraulic conduits 124*a&b*. The locking systems 118*a&b* is connected to the electronic system 120 via electrical conduits 126*a&b*. The doors 108 and 112 are pivotally mounted on the container 102 via hinges 128. The apparatus 100 can also include an external electronic unit 130 in electrical communication with the electronic control system 120 and where the external electronic unit 130 is adapted to allow a person to enter a code to direct the electronic control system 120 to cause the locking systems 118*a&b* to transition between their two states. The container 102 can be a truck trailer, a ship cargo container, or the like.

In this embodiment, the two locking systems 118*a&b* can be controlled independently or collectively depending on the degrees of security desired. If independently controlled, then a telemetry signal must be sent to the electronic system 120, which then activates each locking system 118*a&b* when its authorization code is sent to cause a transition in the locking system's state. The two locking system 118*a&b* are shown disposed on a top and bottom of the door 108.

Figure 2A:
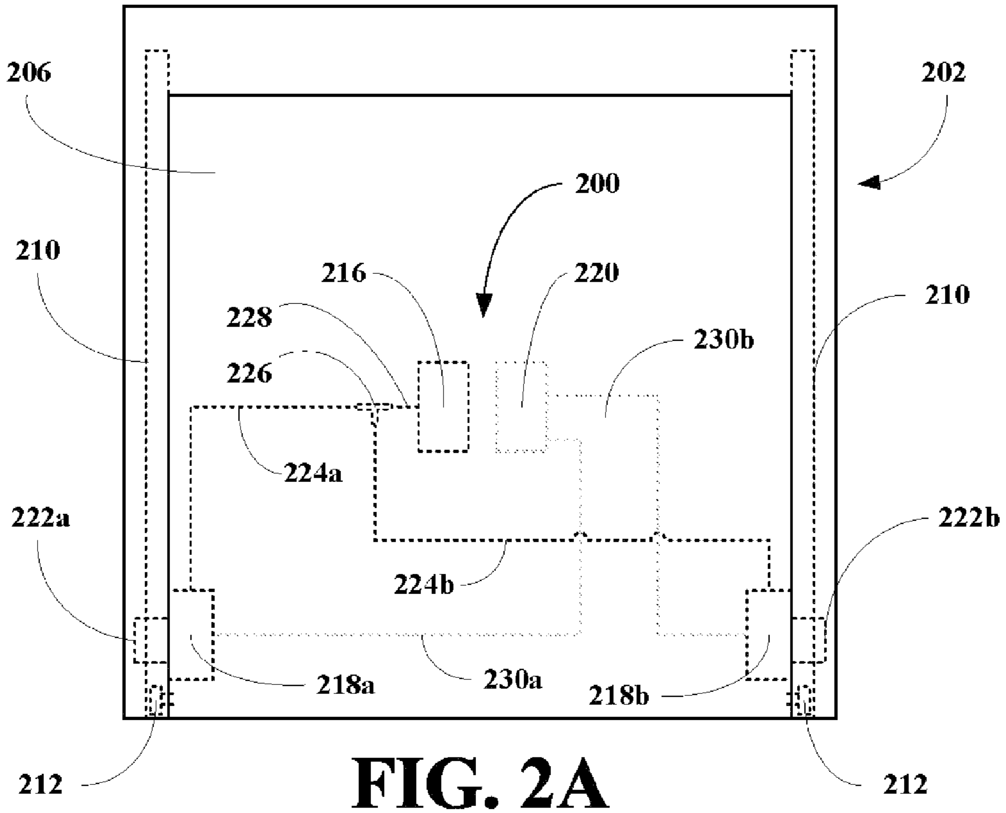
FIGS. 2A&B depict another preferred embodiment of a container internal locking system of this invention.
Figure 2B:
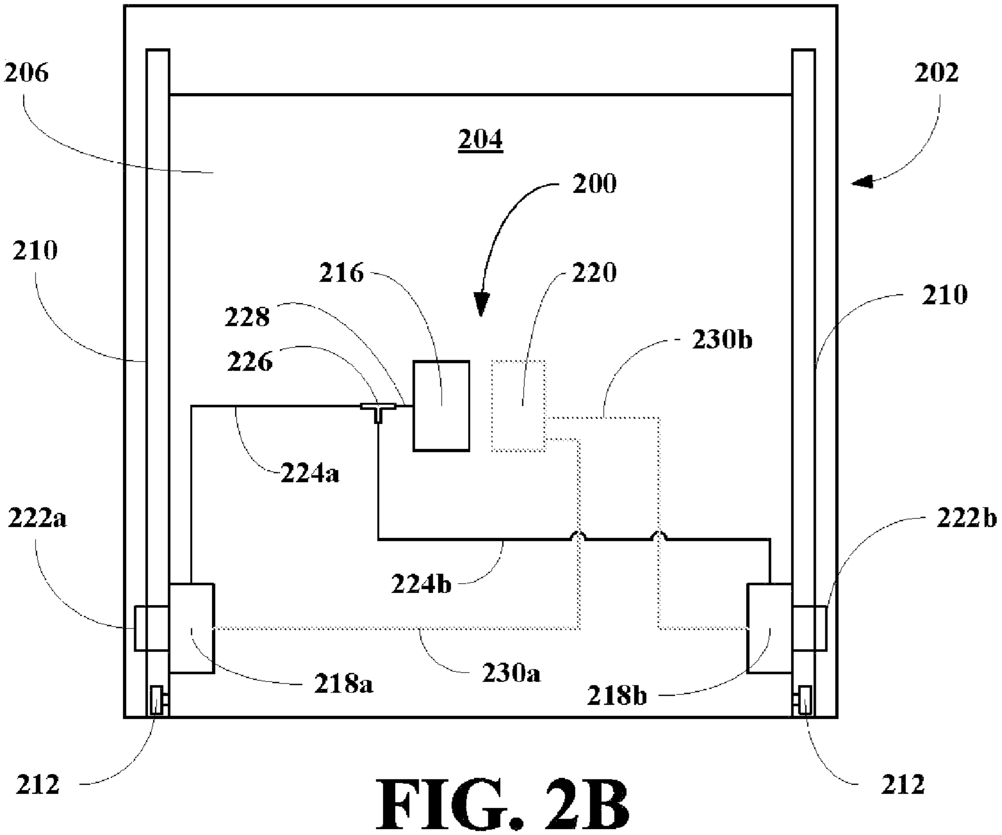
FIGS. 2C&D depict another preferred embodiment of a container internal locking system of this invention.
FIGS. 2E&F depict another preferred embodiment of a container internal locking system of this invention.
Figure 2C:
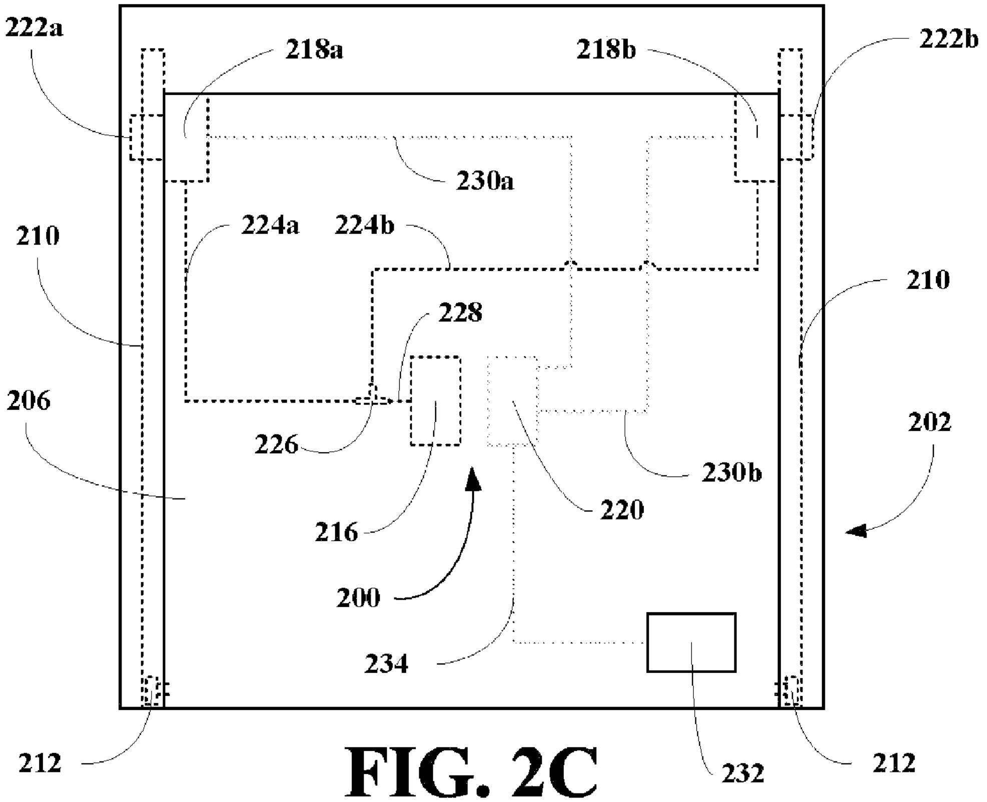
Figure 2D:
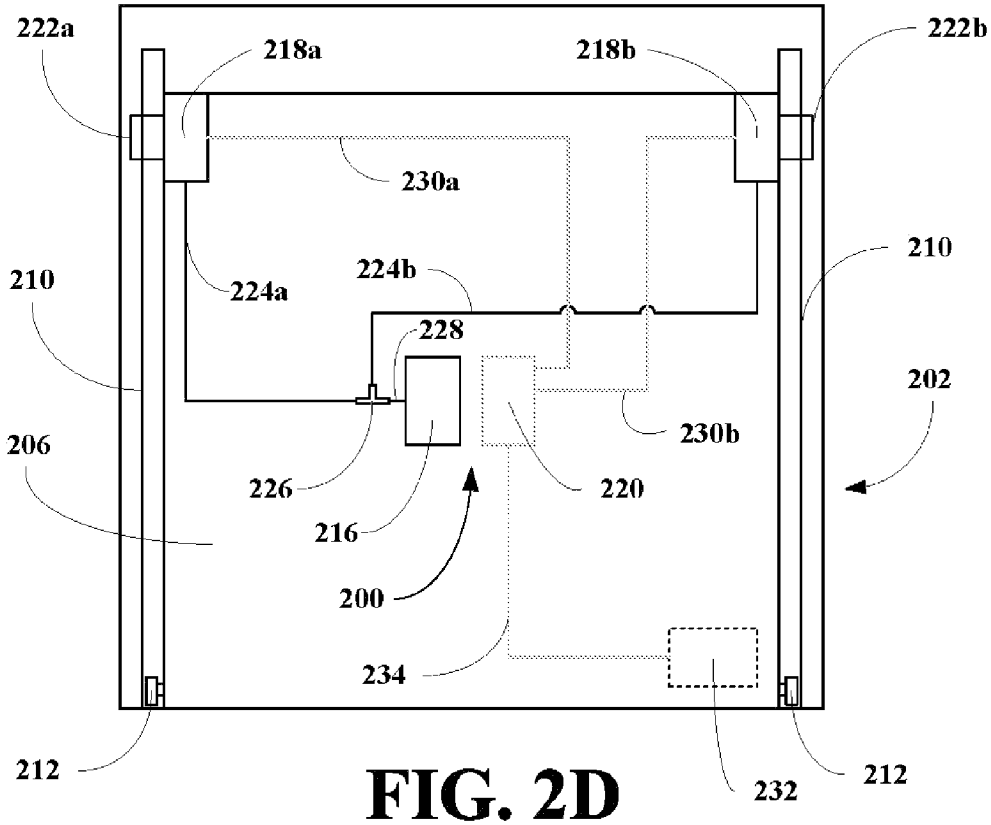

Referring now to FIGS. 2C&D, a preferred embodiment of an internal locking apparatus, generally 200, is shown. The apparatus 200 is mounted within a container 202 on an inner surface 204 of a sliding door 206, where the door 206 runs in a track 210 via wheels 212. The apparatus 200 includes a hydraulic reservoir 216, two hydraulic locking systems 218*a&b*, and an electronic control system 220. Each hydraulic locking system 218*a&b* includes retractable locking members 222*a&b*. The hydraulic reservoir 216 is connected to the hydraulically activated locking systems 218*a&b* via hydraulic lines 224*a&b* originating at a T-junction 226 connected to the reservoir 216 via a hydraulic feed line 228. The locking systems 218*a&b* are connected to the electronic system 220 via electrical wires 230*a&b*. The apparatus 200 can also include an external electronic unit 232 in electrical communication with the electronic control system 220 via a electric wire 234 and where the external electronic unit 232 is adapted to allow a person to enter a code to direct the electronic control system 220 to cause the locking systems 218*a&b* to transition between their two states. The container 202 can be a truck trailer, a ship cargo container, or the like.

Figure 1E:
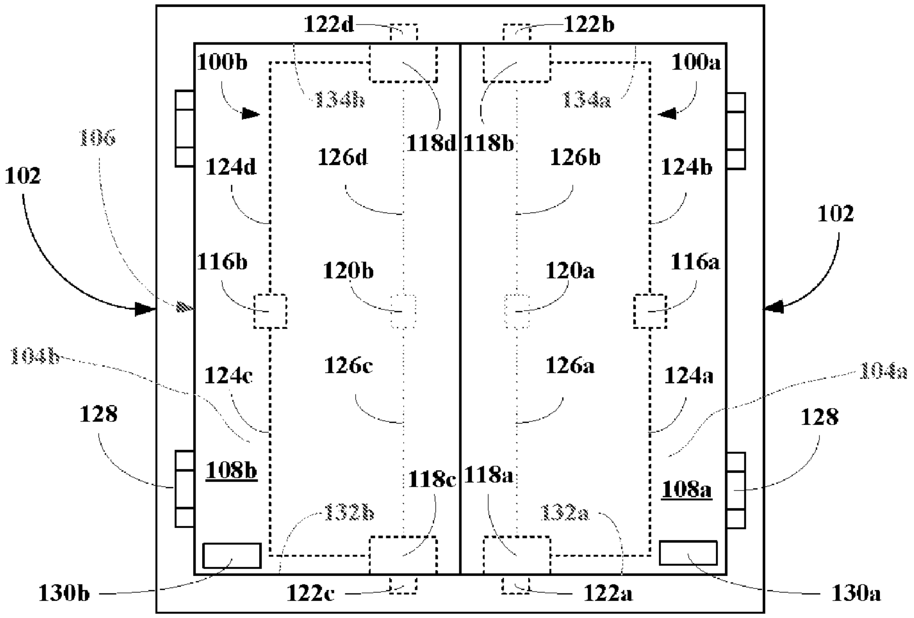
Figure 1F:
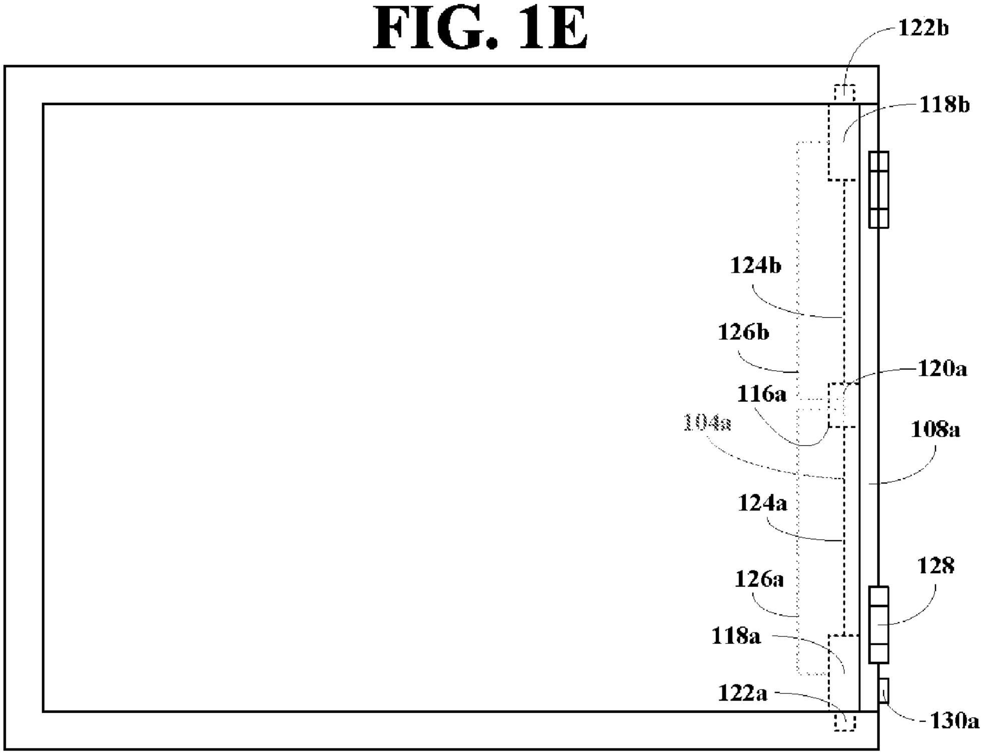

Referring now to FIGS. 1E&F, another preferred embodiment of an internal locking apparatus, generally 100, is shown. Two apparatuses 100*a&b* are mounted within a container 102 on inner surfaces 104*a&b* of a double door 106 having doors 108*a&b*. The apparatus 100*a* includes a hydraulic reservoir 116*a*, two hydraulic locking systems 118*a&b*, and an electronic control system 120*a*. The hydraulic locking system 118*a&b* include a retractable locking member 122*a&b*. The hydraulic reservoir 116*a* is connected to the hydraulically activated locking systems 118*a&b* via hydraulic conduits 124*a&b*. The locking systems 118*a&b* are connected to the electronic system 120*a* via electrical conduits 126*a&b*. The apparatus 100*b* includes a hydraulic reservoir 116*b*, two hydraulic locking systems 118*c&d*, and an electronic control system 120*b*. Each of the hydraulic locking systems 118*c&d* include a retractable locking member 122*c&d*. The hydraulic reservoir 116*b* is connected to the hydraulically activated locking systems 118*c&d* via hydraulic conduits 124*c&d*. The locking systems 118*d&d* are connected to the electronic system 120*b* via electrical conduits 126*c&d*. The doors 108*a&b* are pivotally mounted on the container 102 via hinges 128. The apparatuses 100*a&b* each can also include an external electronic unit 130*a&b* in electrical communication with its respective electronic control system 120*a&b* and where the external electronic units 130*a&b* are adapted to allow a person to enter a code to direct the electronic control systems 120*a&b*, collectively or individually, to cause the locking systems 118*a-d* to transition between their two states. The container 102 can be a truck trailer, a ship cargo container, or the like. The container 102 can be a truck trailer, a ship cargo container, or the like.

In this embodiment, each of the locking systems 118*c-d* can be controlled independently or collectively depending on the degree of security desired. If independently controlled, then a telemetry signal must be sent to the electronic systems 120*a&b* which then activates each of locking system 118*a-d* when its authorization code is sent to cause a transition in the locking system's state. The two locking systems 118*a&c* are shown disposed on bottoms 132*a&b* of the doors 108*a&b*; while the other two locking systems 118*b&d* are shown disposed on tops 134*a&b* of the doors 108 *a&b*.

Referring now to FIGS. 2A&B, another preferred embodiment of an internal locking apparatus, generally 200, is shown. The apparatus 200 is mounted within a container 202 on an inner surface 204 of a sliding door 206, where the door 208 runs in a track 210 via wheels 212. The apparatus 200 includes a hydraulic reservoir 216, a left hydraulic locking system 218*a*, a right hydraulic locking system 218*b*, and an electronic control system 220. The hydraulic locking systems 218*a&b* include retractable locking members 222*a&b*. The hydraulic reservoir 216 is connected to the hydraulically activated locking systems 218*a&b* via hydraulic lines 224*a&b* originating at a T-junction 226 connected to the reservoir 216 via a hydraulic feed line 228. The locking systems 218*a&b* are connected to the electronic system 220 via electrical wires 230*a&b*. The container 202 can be a truck trailer, a ship cargo container, or the like.

Referring now to FIGS. 2C&D, a preferred embodiment of an internal locking apparatus, generally 200, is shown. The apparatus 200 is mounted within a container 202 on an inner surface 204 of a double door 206, where the door 208 runs in a track 210 via wheels 212. The apparatus 200 includes a hydraulic reservoir 216, two hydraulic locking systems 218*a&b*, and an electronic control system 220. The hydraulic reservoir 216 is connected to the hydraulically activated locking systems 218*a&b* via hydraulic lines 222*a&b* originating at a T-junction 224 connected to the reservoir 216 via a hydraulic feed line 226. The locking systems 218*a&b* are connected to the electronic system 220 via electrical wires 228*a&b*. The locking systems 218*a&b* are connected to the electronic system 220 via electrical wire 230*a&b*. The apparatus 200 can also include an external electronic unit 232 in electrical communication with the electronic control system 220 via a electric wire 234 and where the external electronic unit 230 is adapted to allow a person to enter a code to direct the electronic control system 220 to cause the locking systems 218*a&b* to transition between their two states. The container 202 can be a truck trailer, a ship cargo container, or the like.

In this embodiment, the two locking systems 218*a&b* can be controlled independently or collectively depending on the degrees of security desired. If independently controlled, then a telemetry signal must be sent to the electronic system 212 which then activates each locking system 218*a&b* when its authorization code is sent to cause a transition in the locking system's state. The two locking system 218*a&b* are shown disposed on a top of the door 206 on its right and left sides.

Figure 2E:
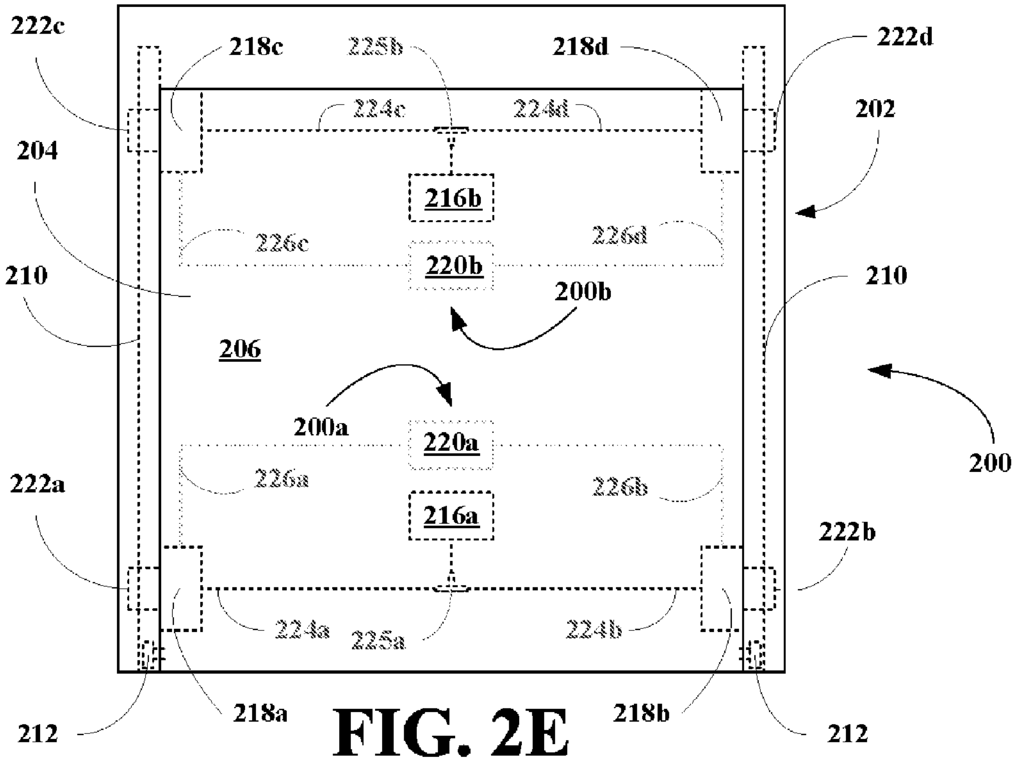
Figure 2F:
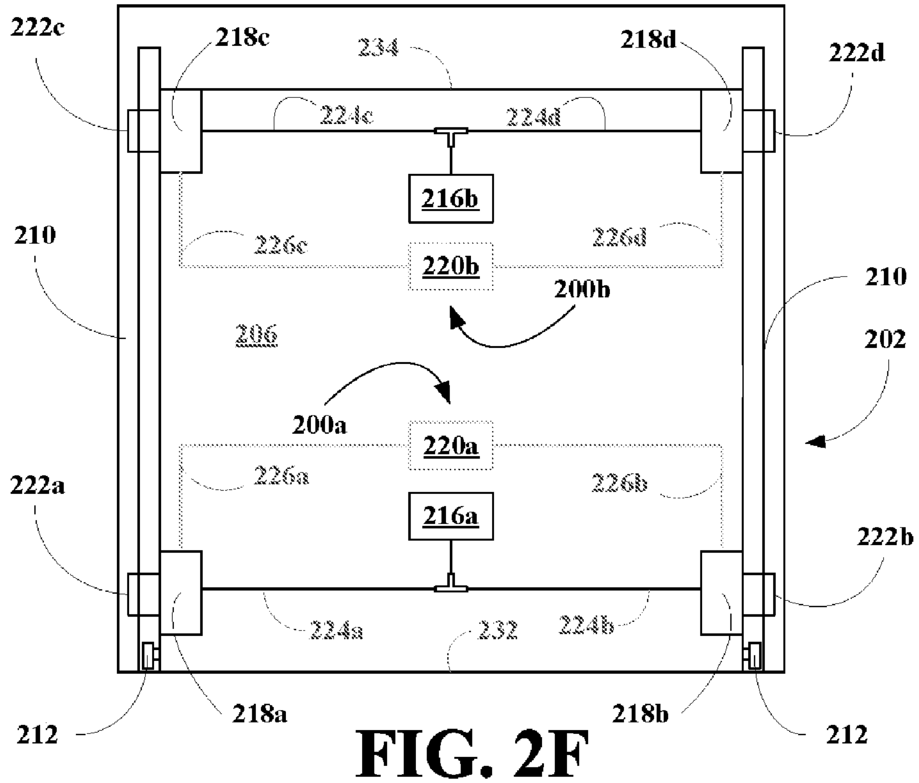

Referring now to FIGS. 2E&F, a preferred embodiment of an internal locking apparatus, generally 200, is shown. Two apparatuses 200*a&b* are mounted within a container 202 on an inner surface 204 of a sliding door 206, where the door 206 runs in a track 210 via wheels 212. The apparatus 200*a* includes a hydraulic reservoir 216*a*, two hydraulic locking systems 218*a&b*, and an electronic control system 220*a*. The hydraulic locking system 218*a&b* include a retractable locking member 222*a&b*. The hydraulic reservoir 216*a* is connected to the hydraulically activated locking systems 218*a&b* via hydraulic conduits 224*a&b* and a T-junction 225*a*. The locking systems 218*a&b* are connected to the electronic system 220*a* via electrical conduits 226*a&b*. The apparatus 200*b* includes a hydraulic reservoir 216*b*, two hydraulic locking systems 218*c&d*, and an electronic control system 220*b*. Each of the hydraulic locking systems 218*c&d* include a retractable locking member 222*c&d*. The hydraulic reservoir 216*b* is connected to the hydraulically activated locking systems 218*c&d* via hydraulic conduits 224*c&d* and a T-junction 225*b*. The locking systems 218*d&d* are connected to the electronic system 220*b* via electrical conduits 226*c&d*. The container 202 can be a truck trailer, a ship cargo container, or the like. The container 202 can be a truck trailer, a ship cargo container, or the like.

In this embodiment, each of the locking systems 218*c-d* can be controlled independently or collectively depending on the degree of security desired. If independently controlled, then a telemetry signal must be sent to the electronic systems 220*a&b* which then activates each of locking system 218*a-d* when its authorization code is sent to cause a transition in the locking system's state. The two locking systems 218*a&c* are shown disposed on a bottom 232 of the sliding door 206; while the other two locking systems 218*b&d* are shown disposed on a top 234 of the sliding door 206.

Figure 3A:
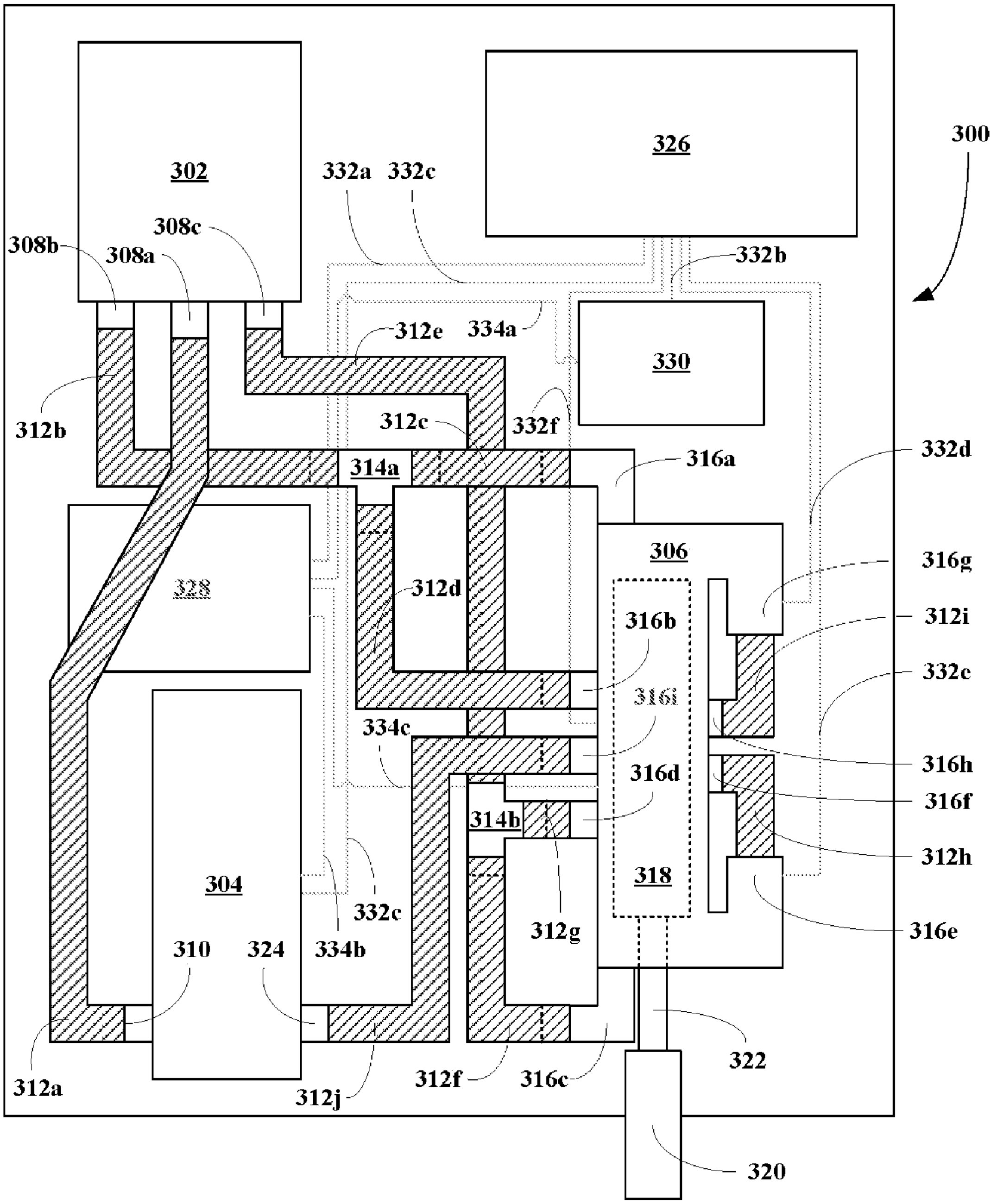
FIG. 3 depicts a preferred embodiment of a self contained internal locking system.

Referring now to FIG. 3, a preferred embodiment of an internal locking system, generally 300, is shown to include a hydraulic reservoir 302, a hydraulic pump 304, and a solenoid valve 306. The reservoir 302 includes three hydraulic fluid outlets 308*a-c*. The first hydraulic fluid outlet 308*a* is connected to a pump inlet 310 of the pump 304 via a first hydraulic line 312*a*. The second hydraulic fluid outlet 308*b* is connected to a first T-joint 314*a* via a second hydraulic line 312*b* and the T-joint 314*a* is connected in turn to a first port 316*a* and a secondport 316*b* of the solenoid valve 306, via third and fourth hydraulic lines 312*c&d*, respectively. The third hydraulic fluid outlet 308*c* is connected to a second T-joint 314*b* via a fifth hydraulic line 312*e* and the T-joint 314*b* is connected in turn to a third port 316*c* and a forth port 316*d* of the solenoid valve 306, via sixth and seventh hydraulic lines 312*f&g*, respectively. The solenoid valve 306 includes an cylinder 318 connected to a retractable locking member 320 via a shaft 322. The solenoid valve 306 also includes a fifth port 316*e* connected to a sixth port 316*f* via a hydraulic line 312*h* and a seventh port 316*g* connected to a eighth port 316*h* via a hydraulic line 312*i*. An outlet 324 of the pump 304 is connected to a ninth port 316*i* via a hydraulic line 312*j*. The system 300 also includes battery 326, an electronic controller 328 and a siren 330. The battery 326 is connected to the electronic controller 328 via a first electric conduit 332*a*, to the siren 330 via a second electric conduit 332*b*, to the pump 304 via a third electric conduit 332*c* and to the valve 306 via fourth, fifth and sixth electric conduits 332*d-f*. The electronic controller 328 is connected to the siren 330 via a first electrical conduit 334*a*, to the pump 304 via a second electrical conduit 334*b*, and to the valve 306 via a third electrical conduit 334*c*.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

The invention claimed is:

1. An internal locking apparatus comprising:
- a source of hydraulic fluid,
- an electronic control system having a power supply, and
- a hydraulically activated locking system including a pump, a solenoid valve, a cylinder, a locking member and shaft, where the hydraulically activated locking system is in fluid communication with the source and in electrical communication with the electronic control system,
- where the source, the electronic control system and the hydraulically activated locking system are all disposed in the interior of an enclosure, where the internal locking apparatus is mounted so that when the hydraulically activated locking system transitions between a locked position and an unlocked position or vis-a-versa, the hydraulically activated locking system locks or unlocks an opening to the enclosure and where the electronic control system provides power via the power supply to the hydraulically activated locking system causing the pump to pump hydraulic fluid into or out of the valve to effectuate the transition and where the hydraulic fluid is supplied by or returned to the source during a transition between the two positions.

2. The apparatus of claim 1, further comprising:

a plurality of locking systems, each mounted inside the enclosure, in electrical communication with the electronic control system and in fluid communication with the source.

3. The apparatus of claim 1, further comprising:

a remote control unit in electronic communication with the electronic control system adapted to allow for remote interaction with the electronic control system to cause the locking system to transition between its two positions.

4. The apparatus of claim 1, further comprising:

an external electronic unit in electrical communication with the electronic control system, where the external electronic unit allows for entry of a code to direct the electronic control system to cause the locking system to transition between its two positions.

5. The apparatus of claim 1, further comprising:

an external electronic unit in electrical communication with the electronic control system, where the external electronic unit allows for entry of a code to direct the electronic control system to cause the locking system to transition between its two positions, and a remote control unit in electronic communication with the electronic control system adapted to allow for remote interaction with the electronic control system to cause the locking system to transition between its two positions.

6. The apparatus of claim 1, wherein the valve comprises a two way, two port, two position 12V DC solenoid valve, which fails in its locked position, where the valve acts as a single acting cylinder and where the pump supplies hydraulic fluid to the cylinder which retracts or extends the locking member depending on the position of an internal spring and where the internal spring generally has an about 7 psi spring force and a piston inside the cylinder is moved either by the spring or the fluid in the cylinder.

7. The apparatus of claim 1, wherein the valve comprises a double acting cylinder, five port, four way, three position 12V DC solenoid valve, where the valve optionally includes an internal spring, which acts as a back up, where the valve fails in its closed position if hydraulic pressure leaks, where the valve opens by putting fluid pressure on one end of the valve, and when the valve in its closed position, with all ports blocked, the force to move the locking member is not the spring force, but is the compressibility of the hydraulic fluid.

8. An internal locking apparatus comprising:

a housing mounted on an inner surface of an enclosure adjacent an openable opening of the enclosure, where the housing includes:

a source of hydraulic fluid, an electronic control system having a power supply, and a hydraulically activated locking system including a pump, a solenoid valve, a cylinder, a locking member and shaft, where the hydraulically activated locking system is in fluid communication with the source and in electrical communication with the electronic control system and including a retractable locking member, where the housing is mounted so that when the hydraulically activated locking system transitions between a locked position extending the locking member and an unlocked position retracting the locking member or vis-a-versa, the electronic control system provides power via the power supply to the hydraulically activated locking system causing the pump to pump hydraulic fluid into or out of the valve to effectuate the transition and where the hydraulic fluid is supplied by or returned to the source during a transition between the two positions.

9. The apparatus of claim 8, further comprising:

a remote control unit in electronic communication with the electronic control system.

10. The apparatus of claim 8, further comprising:

an external electronic unit in electrical communication with the electronic control system, where the external electronic unit allows for entry of a code to direct the electronic control system to cause the locking system to transition between its two positions.

11. The apparatus of claim 8, further comprising:

an external electronic unit in electrical communication with the electronic control system, where the external electronic unit allows for entry of a code to direct the electronic control system to cause the locking system to transition between its two positions, and a remote control unit in electronic communication with the electronic control system adapted to allow for remote interaction with the electronic control system to cause the locking system to transition between its two positions.

12. The apparatus of claim 8, wherein the valve comprises a two way, two port, two position 12V DC solenoid valve, which fails in its locked position, where the valve acts as a single acting cylinder and where the pump supplies hydraulic fluid to the cylinder which retracts or extends the locking member depending on the position of an internal spring and where the internal spring generally has an about 7 psi spring force and a piston inside the cylinder is moved either by the spring or the fluid in the cylinder.

13. The apparatus of claim 8, wherein the valve comprises a double acting cylinder, five port, four way, three position 12 V DC solenoid valve, where the valve optionally includes an internal spring, which acts as a back up, where the valve fails in its closed position if hydraulic pressure leaks, where the valve opens by putting fluid pressure on one end of the valve, and when the valve in its closed position, with all ports blocked, the force to move the locking member is not the spring force, but is the compressibility of the hydraulic fluid.

* * * * *